(12) United States Patent
Patel et al.

(10) Patent No.: US 7,738,896 B2
(45) Date of Patent: Jun. 15, 2010

(54) SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS

(75) Inventors: Krishnakant M. Patel, Dallas, TX (US); Vyankatesh V. Shanbhag, Plano, TX (US); Anand Narayanan, Plano, TX (US)

(73) Assignee: Kodiak Networks, Inc., San Ramon, CA (US)

( * ) Notice: Subject to any disclaimer, the term of this patent is extended or adjusted under 35 U.S.C. 154(b) by 724 days.

(21) Appl. No.: 11/136,233

(22) Filed: May 24, 2005

(65) Prior Publication Data
US 2005/0261016 A1 Nov. 24, 2005

Related U.S. Application Data

(63) Continuation-in-part of application No. 10/515,556, filed as application No. PCT/US03/16386 on May 23, 2003, application No. 11/136,233, which is a continuation-in-part of application No. PCT/US2004/023038, filed on Jul. 16, 2004, which is a continuation-in-part of application No. 11/129,268, filed on May 13, 2005, which is a continuation-in-part of application No. 11/134,883, filed on May 23, 2005, and a continuation-in-part of application No. PCT/US03/16386, filed on May 23, 2003, application No. 11/136,233, which is a continuation-in-part of application No. 11/126,587, filed on May 11, 2005, and a continuation-in-part of application No. 10/515,556, filed on Nov. 23, 2004.

(60) Provisional application No. 60/573,780, filed on May 24, 2004, provisional application No. 60/382,981, filed on May 24, 2002, provisional application No. 60/383,179, filed on May 24, 2002, provisional application No. 60/407,168, filed on Aug. 30, 2002, provisional application No. 60/488,638, filed on Jul. 18, 2003, provisional application No. 60/492,650, filed on Aug. 5, 2003, provisional application No. 60/576,094, filed on Jun. 2, 2004, provisional application No. 60/569,953, filed on May 11, 2004, provisional application No. 60/579,309, filed on Jun. 14, 2004, provisional application No. 60/571,075, filed on May 14, 2004, provisional application No. 60/573,059, filed on May 21, 2004, provisional application No. 60/576,092, filed on Jun. 2, 2004.

(51) Int. Cl.
H04B 7/20 (2006.01)
H04M 3/00 (2006.01)
H04M 3/42 (2006.01)

(52) U.S. Cl. .................. 455/519; 517/518; 517/416

(58) Field of Classification Search .............. 455/558, 455/559, 519, 518, 416, 426.1, 550.1, 566, 455/517, 466
See application file for complete search history.

(56) References Cited

U.S. PATENT DOCUMENTS

| | | | | |
|---|---|---|---|---|
| 5,353,328 | A | * 10/1994 | Jokimies | ............ 455/558 |
| 5,442,809 | A | * 8/1995 | Diaz et al. | ............ 455/511 |
| 5,711,011 | A | 1/1998 | Urs et al. | |
| 5,987,318 | A | 11/1999 | Alperovich et al. | |
| 6,011,976 | A | * 1/2000 | Michaels et al. | ............ 455/466 |
| 6,021,326 | A | 2/2000 | Nguyen | |
| 6,138,011 | A | 10/2000 | Sanders, III et al. | |
| 6,304,558 | B1 | 10/2001 | Mysore | |
| 6,405,030 | B1 | * 6/2002 | Suprunov | ............ 455/410 |
| 6,411,815 | B1 | * 6/2002 | Balasuriya | ............ 455/512 |
| 6,477,366 | B1 | 11/2002 | Valentine et al. | |
| 6,549,773 | B1 | * 4/2003 | Linden et al. | ............ 455/426.1 |
| 6,661,878 | B1 | 12/2003 | Mirashrafi et al. | |
| 6,751,468 | B1 | * 6/2004 | Heubel et al. | ............ 455/518 |
| 6,892,074 | B2 | * 5/2005 | Tarkiainen et al. | ............ 455/466 |
| 6,895,254 | B2 | * 5/2005 | Dorenbosch | ............ 455/518 |
| 7,231,225 | B2 | * 6/2007 | Rao et al. | ............ 455/550.1 |
| 7,366,535 | B2 | * 4/2008 | Glass et al. | ............ 455/519 |
| 7,529,557 | B2 | * 5/2009 | Farrill | ............ 455/518 |
| 2001/0005372 | A1 | 6/2001 | Cave et al. | |

| | | |
|---|---|---|
| 2002/0196781 A1 | 12/2002 | Salovuori |
| 2003/0016632 A1 | 1/2003 | Refai et al. |
| 2003/0078064 A1* | 4/2003 | Chan .......................... 455/514 |
| 2003/0190888 A1* | 10/2003 | Mangal et al. ............. 455/3.05 |
| 2004/0032843 A1* | 2/2004 | Schaefer et al. ............ 370/338 |
| 2004/0057449 A1 | 3/2004 | Black |
| 2004/0259580 A1* | 12/2004 | Florkey et al. .............. 455/519 |
| 2005/0202807 A1* | 9/2005 | Ayyasamy et al. .......... 455/418 |
| 2005/0221819 A1* | 10/2005 | Patel et al. ............... 455/432.1 |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0019654 A1 | 1/2006 | Farrill |
| 2006/0030347 A1 | 2/2006 | Biswas |
| 2006/0189337 A1 | 8/2006 | Farrill et al. |
| 2006/0234687 A1 | 10/2006 | Patel et al. |
| 2007/0037597 A1 | 2/2007 | Biswas et al. |
| 2007/0037598 A1 | 2/2007 | Ayyasamy et al. |

FOREIGN PATENT DOCUMENTS

| | | |
|---|---|---|
| WO | WO 00/79825 | 12/2000 |
| WO | WO 03/101007 | 12/2003 |
| WO | WO2005009006 | 1/2005 |
| WO | WO2005112494 | 11/2005 |
| WO | WO2005115032 | 12/2005 |
| WO | WO2005117474 | 12/2005 |
| WO | WO2006105287 | 10/2006 |

OTHER PUBLICATIONS

ETSI: "ESTI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

NOKIA: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—SKYPE, May 22, 2004, pp. 1-2. XP002345780 http://web.archive.org/web/20040522201727 http://www.skype.com.

Trachwell: "TrackWell Software and Tetra Iceland deliver value added services to Tetra users", TRACKWELL.COM, Oct. 2002, pp. 1-1. XP002345781 http://www.trackwell.com/news/news_twandtetra.htm.

* cited by examiner

*Primary Examiner*—Tilahun Gesesse
(74) *Attorney, Agent, or Firm*—Gates & Cooper LLP (57) ABSTRACT

A Subscriber Identity Module (SIM) that stores the logic and data for providing advanced voice services (AVS) including Push-to-Talk (P2T), Push-to-Conference (P2C), Upgrade to Conference (upgrade from P2T to P2C), Push-to-Message (P2M) and group SMS (Short Message Service), on wireless handsets and networks. When inserted into a handset, the AVS functionality is available for use on the handset, wherein the functionality includes menu displays for the handset, as well as user interaction with the menu displays. The SIM also stores logic and data for providing presence and availability functions on the handset. In addition, the SIM stores the logic and data for providing contact and group management on the handset.

24 Claims, 5 Drawing Sheets

SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS

CROSS REFERENCE TO RELATED APPLICATIONS

This application claims the benefit under 35 U.S.C. Section 119(e) of the following co-pending and commonly-assigned U.S. provisional patent application:

Ser. No. 60/573,780, filed on May 24, 2004, by Krishnakant Patel, Vyankatesh Vasant Shanbhag, and Anand Narayanan, entitled "SIM TOOLKIT,";

which application is incorporated by reference herein.

This application is a continuation-in-part and claims the benefit under 35 U.S.C. Sections 119, 120 and/or 365 of the following co-pending and commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK,", which application claims the benefit under 35 U.S.C. Section 365 of PCT International Patent Application Serial Number PCT/US03/16386, which application claims the benefit under 35 U.S.C. Section 119(e) of U.S. Provisional Patent Application Ser. Nos. 60/382,981, 60/383,179 and 60/407,168;

PCT International Patent Application Number PCT/US04/23038, filed Jul. 16, 2004, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 119(e) of U.S. Provisional Patent Application Ser. Nos. 60/488,638, 60/492,650 and 60/576,094 and which application is a continuation-in-part and claims the benefit under 35 U.S.C. Section 119, 120 and/or 365 of PCT International Patent Application Serial Number PCT/US03/16386;

U.S. patent application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," which application claims the benefit under 35 U.S.C. Section 119(e) of U.S. Provisional Patent Application Ser. Nos. 60/569,953 and 60/579,309, and which application is a continuation-in-part and claims the benefit under 35 U.S.C. Sections 119, 120 and/or 365 of U.S. Utility patent application Ser. No. 10/515,556 and PCT International Patent Application Serial Number PCT/US04/23038;

U.S. patent application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," which application claims the benefit under 35 U.S.C. Section 119(e) of U.S. Provisional Patent Application Ser. No. 60/571,075, and which application is a continuation-in-part and claims the benefit under 35 U.S.C. Sections 119, 120 and/or 365 of U.S. Utility patent application Ser. No. 10/515,556 and PCT International Patent Application Serial Number PCT/US04/23038;

U.S. patent application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," which application claims the benefit under 35 U.S.C. Section 119(e) of U.S. Provisional Patent Application Ser. Nos. 60/573,059 and 60/576,092, and which application is a continuation-in-part and claims the benefit under 35 U.S.C. Sections 119, 120 and/or 365 of U.S. Utility patent application Ser. No. 10/515,556, PCT International Patent Application Serial Number PCT/US04/23038, U.S. Utility patent application Ser. No. 11/126,587, and U.S. Utility patent application Ser. No. 11/129,268;

all of which applications are incorporated by reference herein.

BACKGROUND OF THE INVENTION

1. Field of the Invention

This invention relates in general to wireless communications systems, and more specifically, to a Subscriber Identity Module (SIM) enabling Advanced Voice Services (AVS) including Push-to-Talk (P2T), Push-to-Conference (P2C) and Push-to-Message (P2M) on wireless handsets and networks.

2. Description of Related Art

Group-based voice services, such as two-way half-duplex voice calls within a group or between individuals, also known as "Push-to-Talk," "Press-to-Talk," PTT or P2T, have enormous revenue earnings potential for wireless networks, such as cellular networks and personal communications systems (PCS) networks.

Moreover, the Assignee has introduced Advanced Voice Services (AVS) including improved implementations for P2T, as well as novel group-based voice services such as Push-to-Conference (P2C), Upgrade to Conference (upgrade from P2T to P2C), Push-to-Message (P2M) and group SMS (Short Message Service), for wireless handsets and networks. More information on these advanced voice services can be found in the cross-referenced applications identified above.

To support these advanced voice services, improved handsets are required. Of special interest are handsets that use SIMs (Subscriber Identity Modules). SIMs are embedded with circuitry and when inserted into a handset provides wireless phone service on a particular network. In this context, SIM is generically used to represent SIM (GSM), R-UIM (CDMA) and ISIM.USIM (3G networks).

SIMs store most of the logic required of a handset for providing cellular service, as well as many other functions, including call logs, voice mail, SMS (Short Message Service) and GPRS (General Packet Radio Services) for Internet access. In addition, SIMs store contact information and other user information, making such information portable among handsets.

Consequently, there is a need in the art for handsets that support advanced voice services for wireless communications systems, and more specifically, to SIMs that support advanced voice services, such as Push-to-Talk (P2T), Push-to-Conference (P2C), Upgrade to Conference (upgrade from P2T to P2C), Push-to-Message (P2M) and group SMS (Short Message Service). The present invention aims to satisfy this need.

SUMMARY OF THE INVENTION

To overcome the limitations in the prior art described above, and to overcome other limitations that will become apparent upon reading and understanding the present specification, the present invention discloses a Subscriber Identity Module (SIM) that stores the logic and data for providing advanced voice services (AVS) advanced group-based voice services, such as Push-to-Talk (P2T), Push-to-Conference (P2C), Upgrade to Conference (upgrade from P2T to P2C), Push-to-Message (P2M) and group SMS (Short Message Service), on wireless handsets and networks.

When inserted into a handset, the SIM determines the handset's capabilities, and loads the functionality necessary to support the advanced voice services on the handset. The functionality includes menu displays for the handset, as well as user interaction with the menu displays. Specifically, the functionality includes 1:1 Conference Calls, 1:Many Conference Calls, Dynamic Conference Calls, 1:1 Messaging, or 1:Many Messaging.

The SIM also stores logic and data for providing presence and availability functions on the handset. The presence and availability functions allow a user to select among availability state options, including Logout, Available, and Do Not Disturb.

In addition, the SIM stores the logic and data for providing contact and group management on the handset. The contact and group management allow a user to add, modify or delete members and groups.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention describes a Subscriber Identity Module (SIM) that stores the logic and data for providing advanced voice services (AVS), such as Push-to-Talk (P2T), Push-to-Conference (P2C), Upgrade to Conference (upgrade from P2T to P2C), Push-to-Message (P2M) and group SMS (Short Message Service), on wireless handsets and networks. Consequently, when inserted into a handset, the AVS functionality is available for use on the handset, wherein the functionality includes menu displays for the handset, as well as user interaction with the menu displays. The SIM also stores logic and data for providing presence and availability functions on the handset. In addition, the SIM stores the logic and data for providing contact and group management on the handset.

Network Architecture

Figure 1:
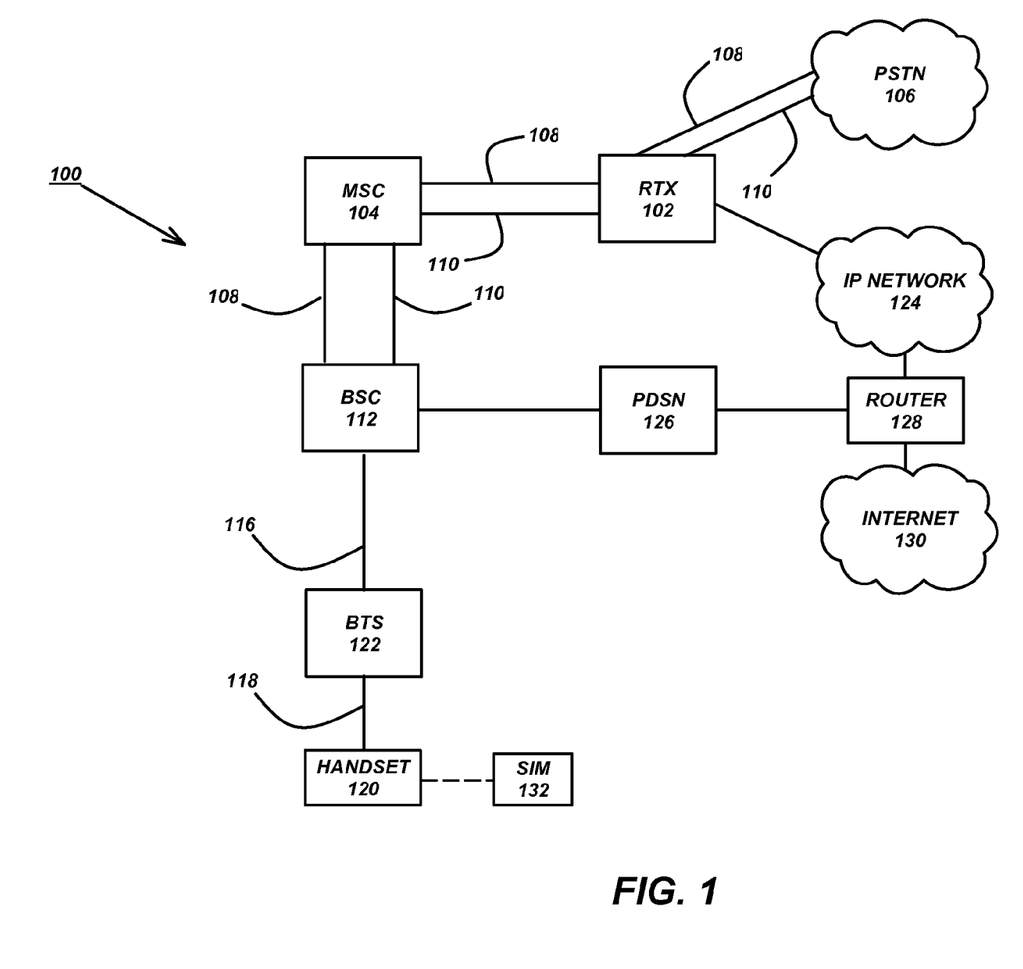
FIG. 1 is a block diagram that illustrates an exemplary embodiment of a wireless communications network according to a preferred embodiment of the present invention.

FIG. 1 is a block diagram that illustrates an exemplary embodiment of a wireless communications network according to a preferred embodiment of the present invention.

Within the network 100, an RTX (Real-Time Exchange) 102, previously known as a Dispatch Gateway (DG), communicates with a MSC (Mobile Switching Center) 104 and PSTN (Public Switched Telephone Network) 106 using SS7—ISUP/WIN/CAMEL (Signaling System 7—Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of an AVS call. The use of TFO ensures high voice quality (as voice vocoder conversion is avoided) between mobile-to-mobile calls.

When a subscriber originates an AVS call, the MSC 104 routes the call to the RTX 102. The MSC 104 also requests the BSC 112 via 116 to establish a radio traffic path 118 with a mobile unit or handset 120 via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the group call request to the RTX 102), the RTX 102 identifies the terminating group users and their MS-ISDN (Mobile Station—Integrated Services Digital Network) numbers. It sends an ISUP call origination request for each terminating handset 120. It may send requests directly to the MSC 104, PSTN 106 or IP network 124 via a PDSN (Public Data Switched Network) 126, Router 128, and/or Internet/Intranet 130, depending on the routing table configuration for terminating MS-ISDN numbers. Once the bearer path 110 is established, the RTX 102 begins a negotiation with the far end (in this case, the terminating BSC 112) for each terminating leg to a handset 120.

Once bearer paths 110 are established for originating and terminating legs for an AVS call, the RTX 102 switches (or duplicates) voice frames from the originating handset 120 to all terminating mobile handsets 120.

The RTX 102 may use an IP network 124 or the Internet/Intranet 130 for two different purposes. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration and presence application. Since the MSC 104 will not direct a registration request from a handset 120 to the RTX 102 (because it would require changes in the MSC 104), the latter does not have any information of the registered mobile handsets 120. To circumvent this issue, a registration and presence application runs over an IP stack in the handset 120. After the handset 120 registers for a data interface (i.e., obtaining an IP address) with the PDSN 126 (or Serving GSM Service Nodes (SGSN) in the case of GSM networks), the registration and presence application in the handset 120 registers with the RTX 102 using its IP address.

The RTX 102 also uses this IP interface to update the presence information of other group members to a handset 120.

An alternative embodiment would use the SMS (Short Message Service) transport to carry presence messages over a data channel. The RTX 102 interacts with the mobile handset 120 using predefined presence application related messages that are transported as SMS messages. The same messages can be transported via the PDSN 126 interface, if group users have data service.

Preferably, the handset 120 is a handset 120 that includes a SIM 132 that is inserted into the handset 120 to provide the wireless phone service. The SIM 132 stores most of the logic (hardware and/or software) required of the handset 120 for providing cellular service, as well as many other functions, including the functions necessary for the AVS features. In addition, the SIM 132 stores contact information and other user information for use by the handset 120.

Real Time Exchange

Figure 2:
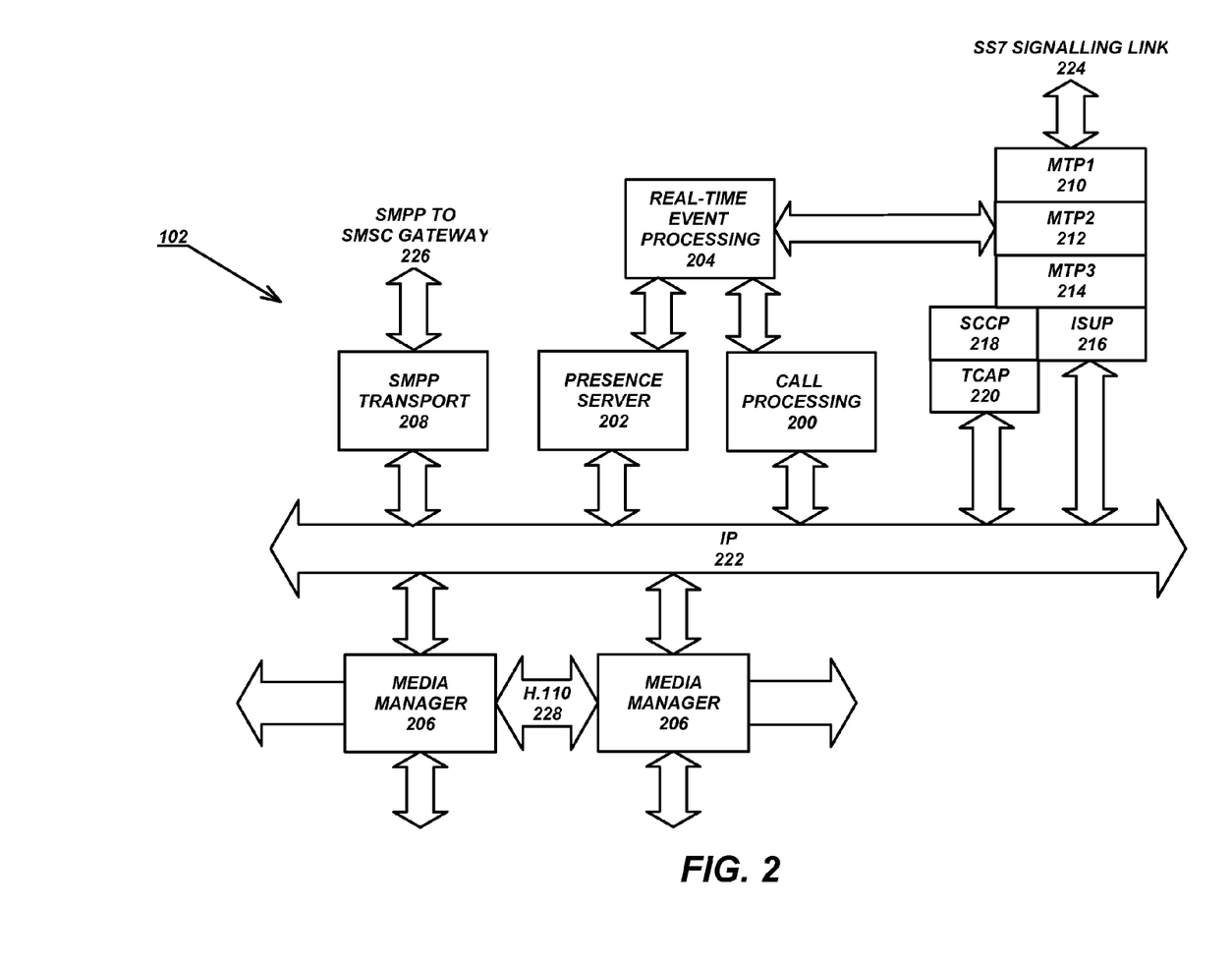
FIG. 2 illustrates a proposed architecture for a real-time exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228 (or some other protocol, such TCP/IP).

The operation of these various components are described in more detail below, as well as in the co-pending and commonly-assigned patent applications cross-referenced above and incorporated by reference herein.

The originating handset 120 signals the RTX 102 via the wireless network 100, e.g., by transmitting one or more configured DTMF (Dual Tone Multi Frequency) digits to the RTX 102. The Media Manager systems 206 receive the DTMF digits and pass the DTMF digits to the Call Processing system 200. The Call Processing (CP) system 200 determines whether the originating handset 120 has subscribed to the AVS feature before originating the AVS call. Upon confirmation, the Call Processing system 200 initiates a new AVS call. The Call Processing system 200 interacts with the Presence Server 202 and Real-Time Event Processing system 204 to cause the wireless network 100 to perform call setup with the terminating handsets 120 for the AVS call, and thereafter to manage the AVS call.

During the AVS call, the Call Processing system 200 interacts with the Media Manager systems 206 to maintain the H.110 channels 227 and assign any additional H.110 channels 228 required for the AVS call, which may span across multiple Media Manager systems 206. During the AVS call, the Media Manager systems 206 of the RTX 102 are used to mix audio streams between the originating handsets 120 and the terminating handsets 120, and then deliver these mixed audio streams to the originating handsets 120 and the terminating handsets 120. The H.110 channels 228 are used for passing mixed and unmixed audio streams voice between the Media Manager systems 200 as required.

Subscriber Identity Module (SIM) Components

Figure 3:
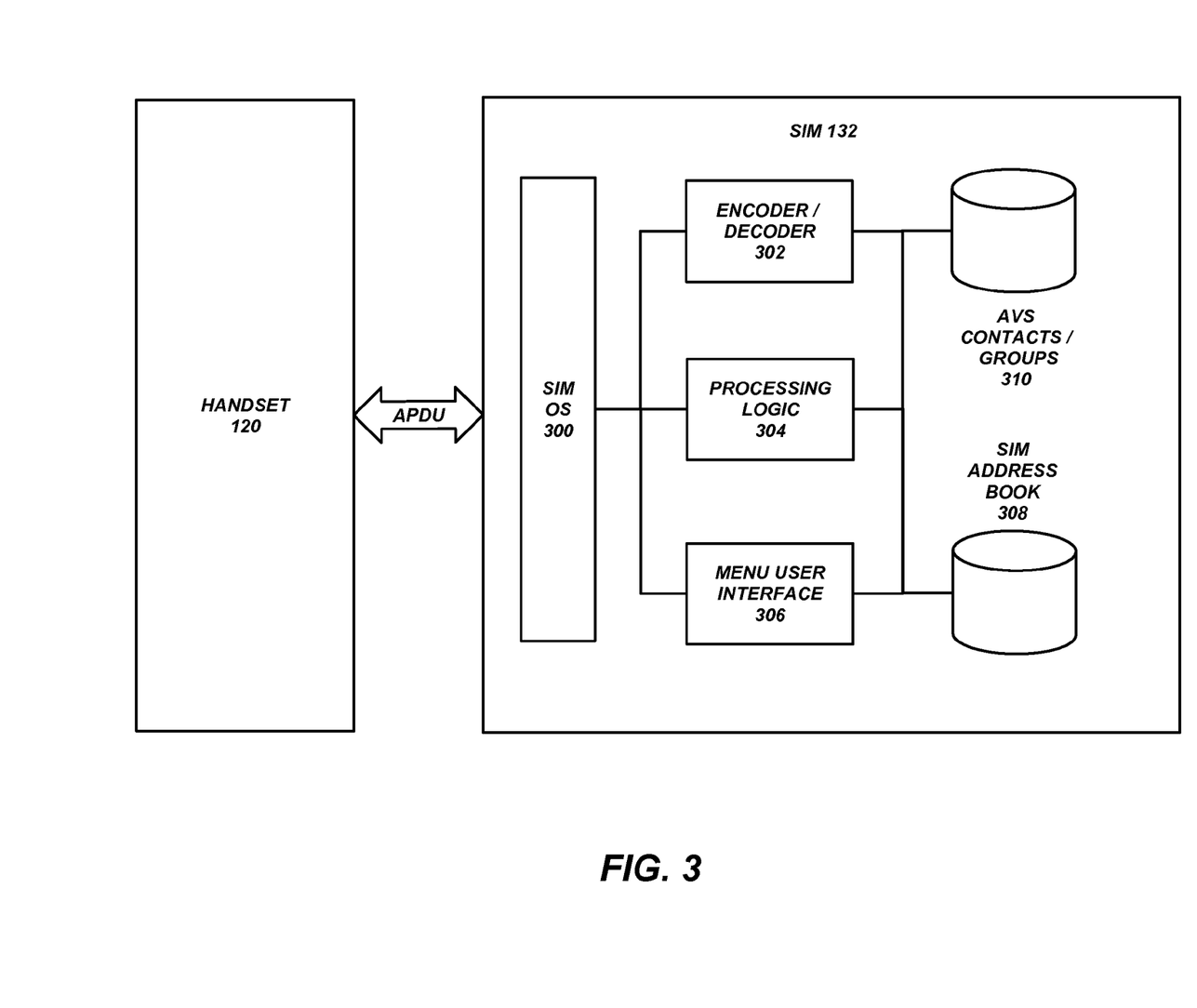
FIG. 3 illustrates the high-level functional components and their interfaces for a subscriber identity module and mobile handset according to a preferred embodiment of the present invention.

FIG. 3 illustrates the high-level functional components and their interfaces in the mobile handset 120/SIM 132 according to a preferred embodiment of the present invention.

The present invention, known as SIMPOWER®, comprises logic (hardware and/or software) components on the SIM 132 that supports AVS functionality on handsets 120 that use SIMs 132. Indeed, the present invention comprises the first voice application to run on a SIM 132.

The high-level functional components and their interfaces include a SIM operating system (OS) 300, encoder/decoder 302, processing logic 304 and menu user interface 306, wherein the encoder/decoder 302, processing logic 304 and menu user interface 306 interface to the OS 300 of the SIM 132 in order to perform their functions. In addition, the SIM 132 provides a SIM address book database 308 and an AVS contacts/groups database 310.

The following AVS functionality is supported by the functional components embedded on the SIM 132:

Contact and Group Management,
Push-to-Talk (P2T),
Push-To-Conference (P2C), also known as "Quick Conference,"
Upgrade to Conference (upgrade from P2T to P2C),
Push-To-Message (P2M),
Group Short Message Service (SMS), and
Presence and Availability.

Consequently, the present invention also allows portability of AVS applications, along with their associated data, such as data on groups and contacts, among different handsets 120 using the same SIMs 132.

The following procedures are used with the present invention. First, the SIM 132 is installed in the handset 120, wherein the SIM 132 includes the functionality necessary to support AVS. Then, at power-on, the SIM 132 determines the handset's 120 capabilities via an APDU (Application Protocol Data Unit) interface, and loads the functionality necessary to support the AVS features on the handset 120. This functionality provided by the SIM 132 includes the "look and feel" of the menu displays on the handset 120, as well as user interaction with the menu displays, wherein the functionality depends on the type of handset 120 being used.

During operation, the encoder/decoder 302 decodes and encodes messages, and populates specific data structures in the handset 120 and/or SIM 132. The encoder/decoder 302 checks the validity of the incoming messages by verifying mandatory parameters for each of the incoming messages. A message will not be processed further if the encoder/decoder 302 fails to decode the message.

The processing logic 304 handles all the AVS related functionalities, such as Group/Private/Dynamic Group calls. The processing logic 304 implementation is device-specific and vendor-specific, and it interacts with the other components, including the encoder/decoder 302, menu user interface 306, address book database 308 or AVS contacts/group database 310.

The processing logic 304 provides an auto-answer mechanism for AVS calls. Specifically, when a call is received, the processing logic 304 automatically answers the call. The processing logic 304 makes use of call notification for incoming call detection and, based on various parameters received within the call notification, determines whether the call is an AVS call. If the call is an AVS call, then the processing logic 304 uses "AT" commands to answer the AVS call and turn on the speaker of the handset 120. (All of this takes place within a certain time period.) On the other hand, if the call is not an AVS call, then control is handed off to the handset 120 for normal call processing.

The processing logic 304 also provides "floor control" using DTMF tone control. In P2T calls, which are half-duplex, a determination of who may talk is based on who has the "floor." Using the processing logic 304 provided in the SIM 132, appropriate DTMF tones are sent to the RTX 102 in accordance with specific key sequences (i.e., pressing and/or releasing a P2T key) that indicate whether the "floor" has been requested and/or released by the user.

In addition, the processing logic 304 provides SMS destination control based on the type of subscriber. At the time of subscriber data provisioning, if it is determined that the handset 120 will use SIM 132 based logic, then appropriate logic is invoked in the RTX 102 to send presence messages over SMS to the SIM 132. Similarly, the SIM 132 is configured at the time of provisioning to receive/accept such SMS and respond to the RTX 102 appropriately.

Finally, the processing logic 304 also enables subscribers to track the presence of fellow members of the group in the network 100 on their mobile handsets 120, and provides a mechanism and API to carry-out contacts and group management operations on the handset 120 and/or SIM 132, such as add member, delete member, etc.

Since most of the presence information is stored in the database 310, the database 310 is tightly integrated with the processing logic 304. The database 310 stores groups, contacts, presence and availability related information. The database 310 information essentially contains group and member information along with presence information associated with each group and member. Apart from group and member information, the database 310 also stores subscriber information, such as privileges, presence information, etc. The other components of the handset 120/SIM 132 may interact with the database 310 to retrieve/update the group, members and presence information for various operations. The database 310 also has pointers to the native address book database 308 on the SIM 132, to provide seamless "alias" naming for contacts used with cellular calls, as well as AVS features.

The menu user interface 306 provides a mechanism for the user to view and manage groups, group members, contacts, presence and availability. The user interface 306 also makes it possible to invoke the AVS features from the group/contact list screens, as described in more detail below.

Subscriber Identity Module (SIM) Functionality

The AVS functionality provided by the SIM 132 is described in more detail below, in conjunction with FIGS. 4A-4G.

Figure 4A:
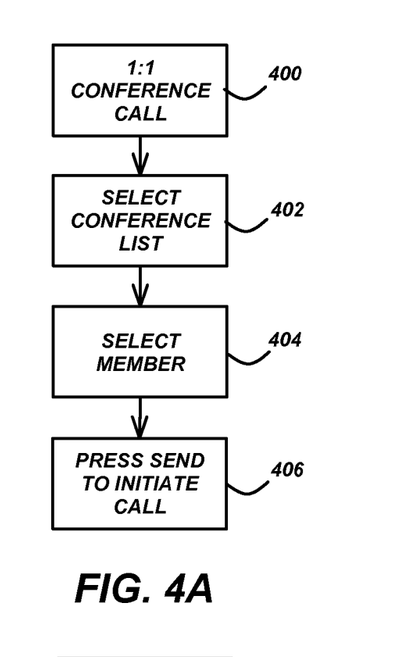
FIGS. 4A-4G illustrate the functionality provided by the subscriber identity module according to the preferred embodiment of the present invention.

FIG. 4A illustrates the logic performed by the SIM 132 with regard to a "1:1 Conference Call," which is invoked on the handset 120 at Block 400. Block 402 represents the user selecting a "Quick Conference" list displayed on the handset 120, Block 404 represents the user scrolling through the contacts on the "Quick Conference" list to select an entry, and Block 406 represents the user pressing the "Send" button to initiate a conference call with the selected contact. Note that a 1:1 conference call is merely a normal call. Note also that the entry in the list includes an icon indicating the presence of the contact, and calls may not be initiated to contacts that are not available to take calls.

Figure 4B:
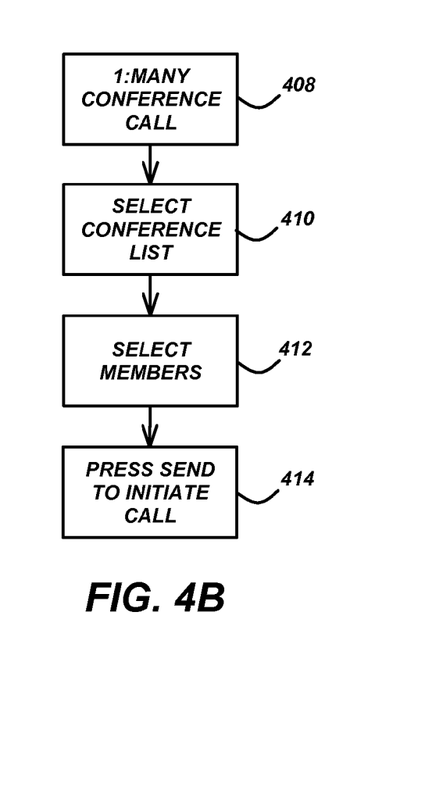

FIG. 4B illustrates the logic performed by the SIM 132 with regard to a "1:Many Conference Call," which is invoked on the handset 120 at Block 408. Block 410 represents the user selecting a "Quick Conference" list displayed on the handset 120, and Block 412 represents the user scrolling through groups in the "Quick Conference" list to select a group. For example, the user may scroll to select a "Technology" Group from the list. Then, Block 414 represents the user pressing the user pressing the "Send" button to initiate a conference call with the selected group, which results in the conference call being established between the user and the members of the group.

Figure 4C:
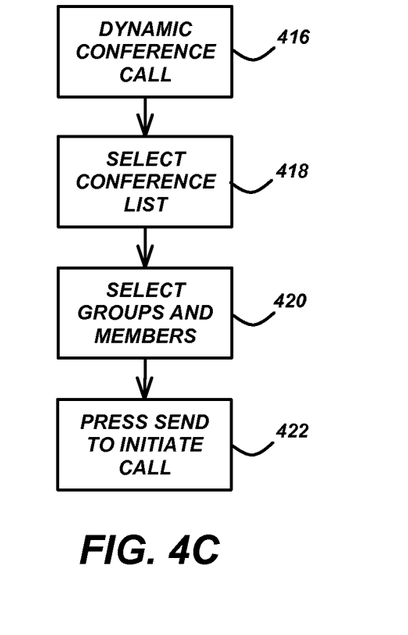

FIG. 4C illustrates the logic performed by the SIM 132 with regard to a "Dynamic Conference Call," which is invoked on the handset 120 at Block 416. Block 418 represents the user selecting a "Quick Conference" list displayed on the handset 120, and Block 420 represents the user scrolling through groups in the "Quick Conference" list to select various members of various groups. For example, the user may scroll to select a "Technology" Group. Within the "Technology" group, the user may scroll to a particular member and select the member by means of a designated key, which changes an icon associated with the selected member to indicate that the member is selected as a member of the dynamic group. The user may select more members by repeating this procedure. Once the members are selected, Block 422 represents the user pressing the "Send" button to initiate a conference call with the selected members of the dynamic group, which results in the conference call being established between the user and other members of the dynamic group. Note that the member entry in the list includes an icon indicating the presence of the member, and calls may not be initiated to members that are not available to take calls.

Figure 4D:
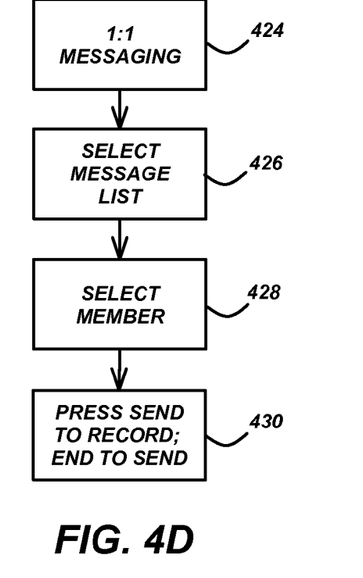

FIG. 4D illustrates the logic performed by the SIM 132 with regard to "1:1 Messaging," which is invoked on the handset 120 at Block 424. Block 426 represents the user selecting a "Push-to-Message" list displayed on the handset 120, and Block 428 represents the scrolling through contacts in the "Push-to-Message" list to select a contact. Block 430 represents the user pressing the "Send" button to record the voice message, wherein the recording ends and the message is sent to the selected contact when the user presses the "End" button.

Figure 4E:
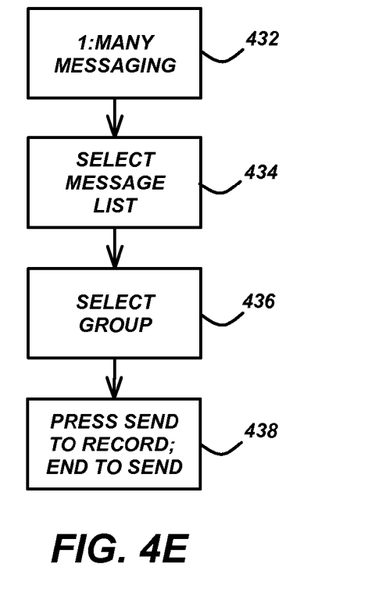

FIG. 4E illustrates the logic performed by the SIM 132 with regard to "1:Many Messaging," which is invoked on the handset 120 at Block 432. Block 434 represents the user selecting a "Push-to-Message" list displayed on the handset 120, and Block 436 represents the scrolling through the "Push-to-Message" list to select a group. For example, the user may select a "Technology" Group. Then, Block 438 represents the user pressing the "Send" button to record the voice message, wherein the recording ends and the message is sent to the members of the selected group when the user presses the "End" button.

Figure 4F:
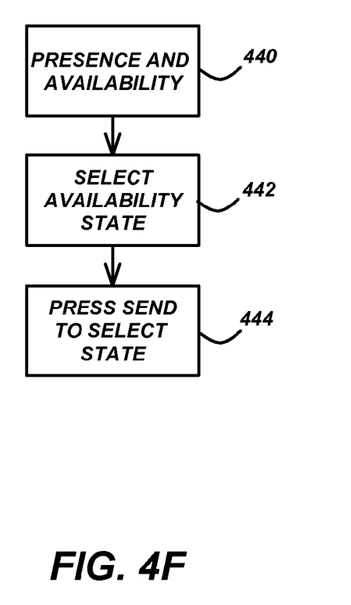

FIG. 4F illustrates the logic performed by the SIM 132 with regard to "Presence and Availability," which is invoked on the handset 120 at Block 440. Block 442 represents the user selecting a "Change Availability" menu item, wherein the "Change Availability" menu provides the following availability state options: Logout, Available, and Do Not Disturb (each with their own distinctive icon). Block 444 represents the user selecting the desired availability state option and Block 446 represents the user pressing a designated key to change to that state. Note that the change in presence on the handset 120 is applied only locally.

Figure 4G:
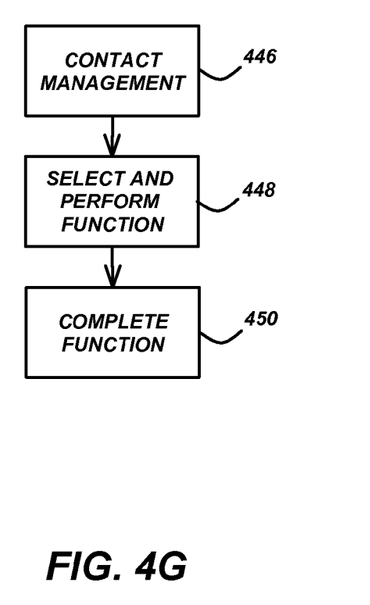

FIG. 4G illustrates the logic performed by the SIM 132 with regard to "Contact Management," which is invoked on the handset 120 at Block 446. Specifically, Block 446 represents the user selecting a "Manage Contacts" menu item, wherein the "Manage Contacts" menu provides the following function options: Add New, Modify and Delete. Block 448 represents the user selecting and performing the desired function option and Block 450 represents the user pressing a designated key to complete the function. With regard to "Add New," Block 448 represents the user being prompted to enter a Name and Number, and the user entering the Name and Number, and then Block 450 represents the user pressing a designated key to complete the function. With regard to "Delete," Block 448 represents the user scrolling through a list of contacts to a desired entry, and then Block 450 represents the user pressing a designated key to complete the function. With regard to "Modify," Block 448 represents the user scrolling through a list of contacts to a desired entry, selecting the desired entry, the user being prompted to enter a Name and/or Number to modify the selected entry, and the user entering the Name and Number, and then Block 450 represents the user pressing a designated key to complete the function.

Note that, in the above figures, the particular sequence of steps, designated keys, items displayed, functions performed and prompts displayed are for illustrative purposes only. Those skilled in the art will recognize that other sequences of steps, designated keys, items displayed, functions performed or prompts displayed may be used without departing from the scope of the present invention.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing advanced voice services (AVS) that comprise Push-To-Talk (P2T) in a wireless network, comprising:
    a handset for communicating with the wireless network in order to provide the advanced voice services,
    wherein the wireless network is used for making calls to and from the handset, and the calls are initiated by call setup and in-band signaling within the wireless network and voice frames for the calls are switched to and from the handset across bearer paths in the wireless network,
    wherein a real-time exchange interfaces to at least one mobile switching center in the wireless network to provide advanced voice services therein,
    wherein the real-time exchange and the handset that provides the advanced voice services communicate with each other using the call setup and in-band signaling within the wireless network, such that at least one mobile switching center routes an originating leg of the advanced voice services to the real-time exchange, the real-time exchange initiates one or more terminating legs of the advanced voice services through at least one mobile switching center, and the real-time exchange switches the voice frames for the advanced voice services for the originating and terminating legs across the bearer paths and through at least one mobile switching center in the wireless network, and
    wherein the handset includes a subscriber identity module (SIM) that stores software for performing the advanced voice services and data for providing the advanced voice services on the handset, the handset accesses the software from the SIM, and the software includes menu displays for the advanced voice services, as well as user interaction with the menu displays.

2. The apparatus of claim 1, wherein the advanced voice services further comprise Push-to-Conference (P2C), Upgrade to Conference, Push-to-Message (P2M) or Group SMS (Short Message Service).

3. The apparatus of claim 1, wherein the SIM stores software and data for providing presence and availability functions on the handset.

4. The apparatus of claim 3, wherein the presence and availability functions allow a user to select among availability state options, including Logout, Available, and Do Not Disturb.

5. The apparatus of claim 1, wherein the SIM stores software and data for providing groups and contacts management for the advanced voice services.

6. The apparatus of claim 5, wherein the groups and contacts management allow a user to add, modify or delete members and groups.

7. The apparatus of claim 1, wherein the SIM determines the handset's capabilities, and loads functionality necessary to support the advanced voice services features on the handset.

8. The apparatus of claim 6, wherein the functionality includes menu displays for the handset, as well as user interaction with the menu displays.

9. The apparatus of claim 8, wherein the functionality includes 1:1 Conference Calls, 1:Many Conference Calls, Dynamic Conference Calls, 1:1 Messaging, or 1:Many Messaging.

10. The apparatus of claim 1, wherein the SIM answers calls, determines the call is an advanced voice services call and answers the advanced voice services call.

11. The apparatus of claim 1, wherein the SIM provides floor control for Push-to-Talk calls.

12. The apparatus of claim 1, wherein the SIM provides Short Message Service (SMS) destination control based on a type of subscriber.

13. A method of providing advanced voice services that comprise Push-To-Talk (P2T) in a wireless network, comprising:
    communicating with the wireless network using a handset in order to provide the advanced voice services,
    wherein the wireless network is used for making calls to and from the handset, and the calls are initiated by call setup and in-band signaling within the wireless network and voice frames for the calls are switched to and from the handset across bearer paths in the wireless network,
    wherein a real-time exchange interfaces to at least one mobile switching center in the wireless network to provide advanced voice services therein,
    wherein the real-time exchange and the handset that provides the advanced voice services communicate with each other using the call setup and in-band signaling within the wireless network, such that at least one mobile switching center routes an originating leg of the advanced voice services to the real-time exchange, the real-time exchange initiates one or more terminating legs of the advanced voice services through at least one mobile switching center, and the real-time exchange switches the voice frames for the advanced voice services for the originating and terminating legs across the bearer paths and through at least one mobile switching center in the wireless network, and wherein the handset includes a subscriber identity module (SIM) that stores software for performing the advanced voice services and data for providing the advanced voice services on the handset, the handset accesses the software from the SIM, and the software includes menu displays for the advanced voice services, as well as user interaction with the menu displays.

14. The method of claim 13, wherein the advanced voice services further comprise Push-to-Conference (P2C), Upgrade to Conference, Push-to-Message (P2M) or Group SMS (Short Message Service).

15. The method of claim 13, wherein the SIM stores software and data for providing presence and availability functions on the handset.

16. The method of claim 15, wherein the presence and availability functions allow a user to select among availability state options, including Logout, Available, and Do Not Disturb.

17. The method of claim 13, wherein the SIM stores software and data for providing groups and contacts management for the advanced voice services.

18. The method of claim 17, wherein the groups and contacts management allow a user to add, modify or delete members and groups.

19. The method of claim 13, wherein the SIM determines the handset's capabilities, and loads functionality necessary to support the advanced voice services features on the handset.

20. The method of claim 19, wherein the functionality includes menu displays for the handset, as well as user interaction with the menu displays.

21. The method of claim 20, wherein the functionality includes 1:1 Conference Calls, 1:Many Conference Calls, Dynamic Conference Calls, 1:1Messaging, or 1:Many Messaging.

22. The method of claim 13, wherein the SIM answers calls, determines the call is an advanced voice services call and answers the advanced voice services call.

23. The method of claim 13, wherein the SIM provides floor control for Push-to-Talk calls.

24. The method of claim 13, wherein the SIM provides Short Message Service (SMS) destination control based on a type of subscriber.

* * * * *